United States Patent [19]

Hanlon et al.

[11] Patent Number: 4,817,908

[45] Date of Patent: Apr. 4, 1989

[54] SEAT SUSPENSION FOR UNDERGROUND MINING MACHINES

[75] Inventors: Ronald D. Hanlon, Titusville; Ronald K. Dickey, Meadville, both of Pa.

[73] Assignee: Joy Technologies Inc., Franklin, Pa.

[21] Appl. No.: 79,174

[22] Filed: Jul. 29, 1987

[51] Int. Cl.[4] .............................................. F16M 13/00
[52] U.S. Cl. .................................... 248/564; 248/581; 297/308
[58] Field of Search ............... 298/562, 638, 157, 560, 298/564, 580, 581, 592, 593, 594, 599, 602, 618, 622, 623, 624, 636, 669, 161; 297/307, 308, 345

[56] References Cited

U.S. PATENT DOCUMENTS

| | | | |
|---|---|---|---|
| 1,105,960 | 8/1914 | Bryant | 248/157 |
| 2,550,170 | 4/1951 | Spiess | 297/308 |
| 2,571,180 | 10/1951 | Ball et al. . | |
| 2,598,421 | 5/1952 | Page | 297/308 |
| 2,629,427 | 2/1953 | McIntyre | 297/308 |
| 3,572,828 | 3/1971 | Lehner | 297/308 |
| 3,678,864 | 7/1972 | Gutridge . | |
| 3,705,745 | 12/1972 | Ambrosius | 248/562 |
| 3,861,637 | 1/1975 | DeLongchamp | 248/581 |
| 3,999,733 | 12/1976 | Harder, Jr. | 248/161 |
| 4,058,859 | 11/1977 | Arrowood | 248/297.3 |
| 4,065,167 | 12/1977 | Wright . | |
| 4,078,629 | 3/1978 | Kutay et al. . | |
| 4,186,963 | 2/1980 | Koutsky | 297/308 |
| 4,275,800 | 6/1981 | Batzel . | |
| 4,351,556 | 9/1982 | Worringer . | |
| 4,365,682 | 12/1982 | Frey et al. . | |
| 4,662,597 | 5/1987 | Uecker | 248/564 |

FOREIGN PATENT DOCUMENTS 35028  3/1977  Japan ................................ 297/308

Primary Examiner—J. Franklin Foss
Assistant Examiner—Robert A. Olson
Attorney, Agent, or Firm—Kirkpatrick & Lockhart

[57] ABSTRACT

A compact seat suspension for an underground mining machine is disclosed in which a vertical suspension is operably connected between a fixed bracket and a sliding bracket for supporting a seat and for reducing and dampening vibration and shock transmitted from the mining machine to the seat. The fixed bracket is attached to a side wall of the mining machine and includes one or more vertical guide members. The sliding bracket is movably mounted on the vertical guide members for relative vertical movement with respect to the fixed bracket. The sliding bracket is attached to the back portion of a seat provided within the mining machine. The entire compact assembly is adapted to be positioned entirely behind rather than beneath the seat, making it possible to utilize the suspension in areas of reduced height. The fixed bracket may be adjustably attached to the mining machine by a pair of hanger members which include recesses adapted to receive and retain pins which extend outwardly from opposite edges of the fixed bracket.

10 Claims, 4 Drawing Sheets

SEAT SUSPENSION FOR UNDERGROUND MINING MACHINES

BACKGROUND OF THE INVENTION

1. Field of the Invention

The present invention relates to a seat suspension for underground mining machines. More specifically, the present invention relates to a compact seat suspension which is adapted to be mounted entirely behind a seat and which only allows for limited vertical travel of the seat.

2. Description of the Prior Art

The provision of seat suspensions beneath an operator's or passenger's seat of various types of vehicles is well known. For example, U.S. Pat. No. 4,351,556 discloses the provision of a vertical suspension system which includes springs and shock absorbers for supporting a seat and isolating vertical vibration and dampening of vertical vibration between the chassis and the seat.

Even in the field of mining machines, such as mining shuttle cars, tractors, utility vehicles or other forms of continuous mining machines, seat suspensions located beneath the seat has been utilized on medium and high seam machines. To applicants' knowledge, however, seat suspensions which include springs and shock absorbers have not been utilized on low seam machines for the simple reason that there is often not enough room under the seat in such machines for a suspension.

It is also well known in the art to provide some type of suspension means between an operator's compartment or cab of a mining machine and the mining machine body. Such suspension means are frequently utilized to maintain the operator's compartment a desired height above the floor, or, in some cases, to allow the operator's compartment to rest on the mine floor to minimize the overall height of the operator's compartment. Examples of various types of suspension means utilized for operator's compartments are disclosed in U.S. Pat. Nos. 4,078,629; 4,065,167; 3,678,864; 4,365,682; and 4,275,800. While these patents provide an effective mechanism for supporting and adjusting the relative vertical position of an operator's compartment with respect to the vehicle, these patents do not in any way suggest a solution to the problem of providing a compact seat suspension within the limited space available inside an operator's compartment of a mining machine.

SUMMARY OF THE INVENTION

The present invention provides a seat suspension for an underground mining machine which includes a fixed bracket means attached to a side wall of an operator compartment of an underground mining machine. The fixed bracket means includes vertical guide means, preferably in the form of two parallel vertical rod members. The suspension also includes a sliding bracket means moveably mounted on the vertical guide means for relative vertical movement with respect to the fixed bracket means. The sliding bracket means is attached to a back portion of a seat provided within the operator compartment.

Vertical suspension means is provided and is operably connected between the fixed bracket means and the sliding bracket means for supporting the seat and for reducing and dampening vibration and shock transmitted from the mining machine to the seat. Unlike existing seat suspensions, the seat suspension of the present invention is compactly positioned entirely behind the seat.

The vertical suspension means of the present invention preferably includes both compression spring means and dampening means. The dampening means is preferably a hydraulic cylinder but may be a pneumatic cylinder or other device which dampens vibration of the seat. In the preferred embodiment, the compression spring means consists of a pair of spaced apart vertically aligned compression springs with a single hydraulic cylinder provided centrally between the sliding bracket means and the fixed bracket means with an upper end of the cylinder attached to an upper end of the sliding bracket means and a lower end of the cylinder attached to a lower end of the fixed bracket means.

The vertical guide means of the present invention preferably consists of two parallel vertical rod members positioned on opposite sides of the hydraulic cylinder. Each rod member has upper and lower ends attached respectively to upper and lower ends of the fixed bracket means and the sliding bracket means includes a pair of upper spaced apart horizontal aperatured flange segments on an upper end thereof and a pair of lower spaced apart horizontal aperatured flange segments on a lower end thereof. The flange segments are sized and positioned to receive and travel on the rod members. Preferably, the upper and lower ends of the rod members are threaded, extend through and are attached to the fixed bracket means by a spaced apart upper pair and a spaced apart lower pair of horizontally aperatured flange segments provided on the fixed bracket means and by nuts.

The compression spring means of the present invention preferably consists of a pair of compression springs, one positioned on each of the rod members. The compression springs are retained between upper flange segments of the sliding bracket means and a pair of spaced apart intermediate horizontal aperatured flange segments provided on the fixed bracket means intermediate the upper and lower end thereof.

The seat suspension of the present invention preferably includes a fixed bracket means which is adjustably attached to the side wall by hanger means which allows the fixed bracket means to be selectively positioned at any one of a plurality of spaced apart vertical locations. The hanger means further comprises two pairs of vertically spaced apart pins, one pair extending outwardly from each of two opposite side edges of the fixed bracket means and a pair of vertically extending spaced apart hanger members. The hanger members are securely attached to the side wall of the operator's compartment and are adapted to receive and retain the pins at a desired vertical height. Each of the hanger members has a generally L-shaped cross sectional configuration with one wall portion affixed to the side wall of the operator's compartment and a remaining wall portion adapted to receive the pins. The remaining wall portion includes an elongated recess extending substantially the entire length of the member and includes a plurality of notches along one side thereof, sized and configured to receive and retain the pins at a desired vertical height. The pins are held captive in the recesses to prevent detachment of the seat without first removing the hanger members from the side wall of the operator compartment.

Accordingly, it is an object of the present invention to provide a compact seat suspension for an underground mining machine.

It is another object of this invention to provide such a compact suspension which allows for limited vertical travel of the seat so that it may be utilized in operator compartments having relatively low vertical profiles.

It is yet another object of the invention to provide a suspension means which includes both spring means and hydraulic cylinder means for supporting the seat and for reducing and dampening of vibration and shock transmitted from the mining machine to the seat.

It is yet another object of the present invention to provide such a seat suspension which may be adjustably attached to a side wall of an operator's compartment by hanger means which allow the suspension to be selectively positioned at any one of a plurality of spaced apart vertical locations.

These and other objects and advantages of the present invention will be more fully understood upon reference to the appended figures and the detailed description of the preferred embodiment of the present invention which follows.

DESCRIPTION OF THE PREFERRED EMBODIMENT

Figure 1:
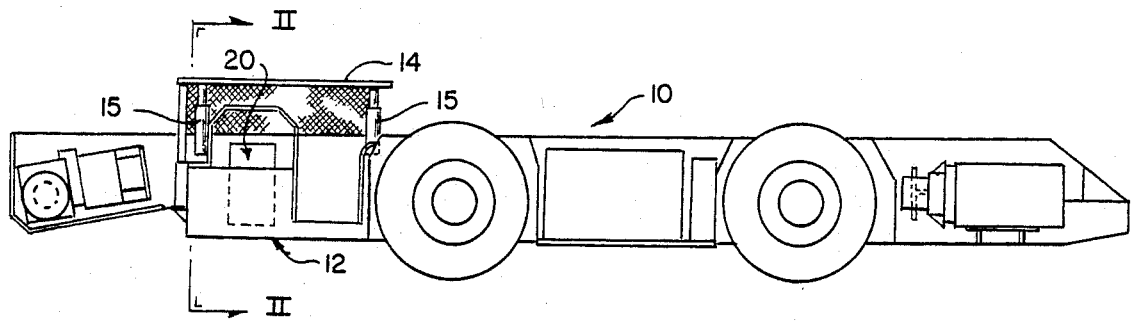
FIG. 1 is a side elevational view showing the general arrangement of a mining shuttle car.
Figure 2:
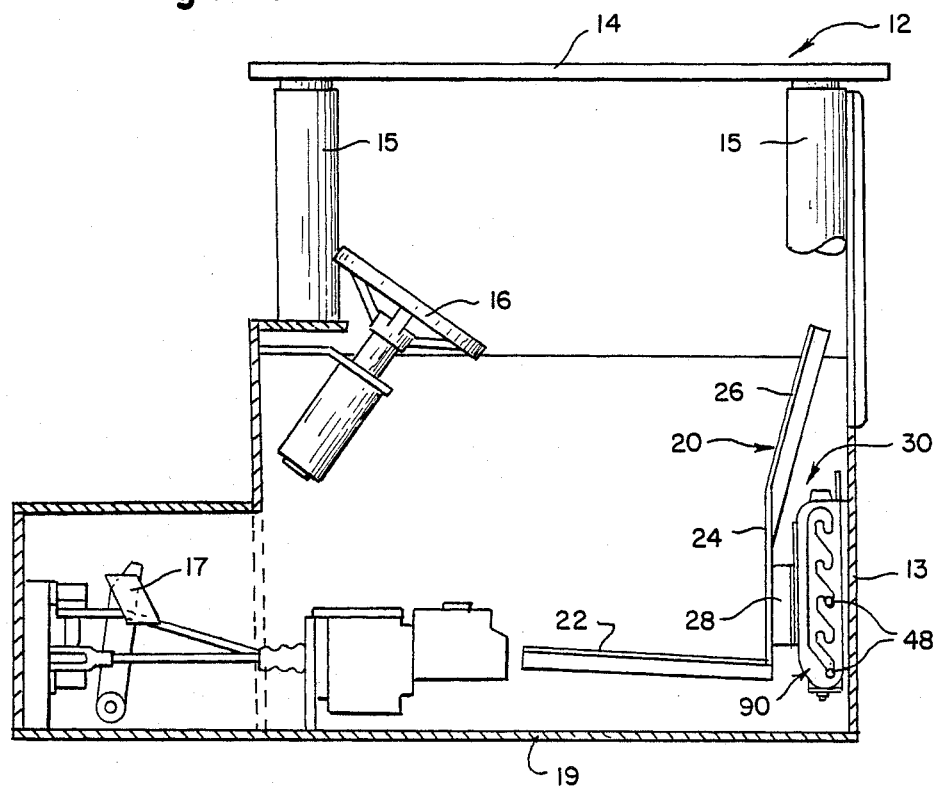
FIG. 2 is a partial cross sectional view taken on the line II—II of IG. 1 showing the general location of the seat suspension of the present invention within the operator's compartment of the shuttle car.
Figure 3:
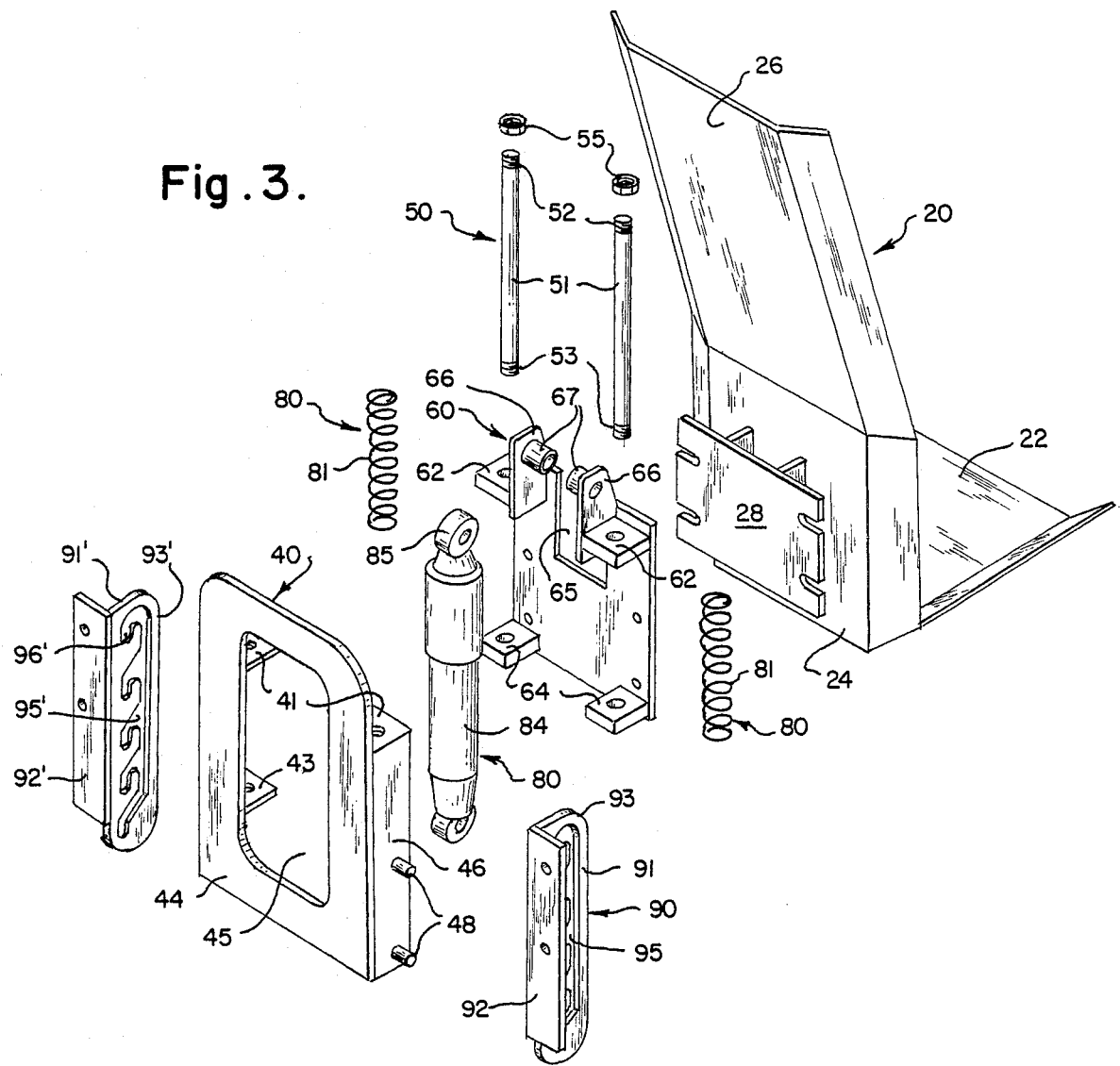
FIG. 3 is an exploded isometric view of the seat suspension of the present invention.
Figure 8:
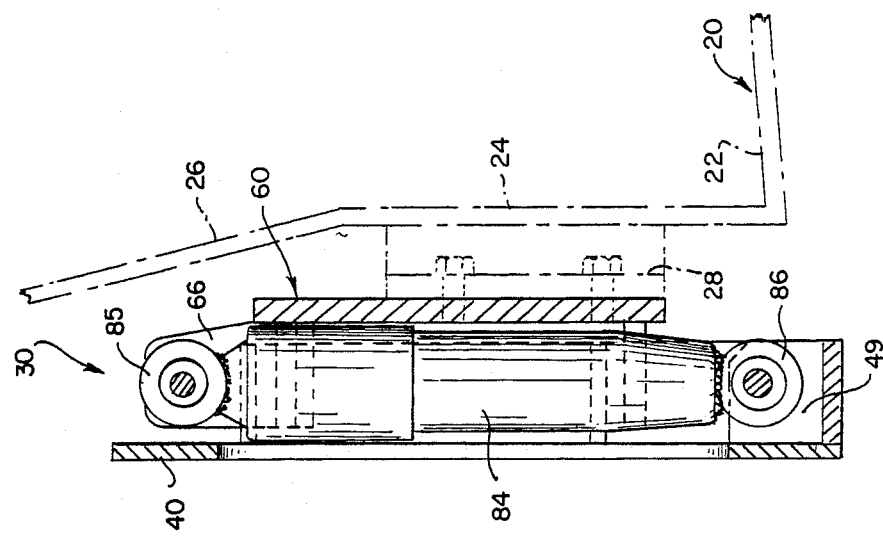
FIG. 8 is a cross sectional view taken on the line VIII—VIII of FIG. 6 also showing the location of the seat in chain line.

Referring to FIGS. 1 and 2, the general location of the seat suspension of the present invention is shown. For the purposes of illustrating the utility of the present invention, the invention is shown as attached to an operator's compartment 12 of a mining shuttle car 10. It is to be understood, however, that the seat suspension of the present invention may be suitably utilized in various other forms of mining vehicles in which seats are placed in areas of reduced height. In the embodiment shown, an adjustable canopy 14 is provided on the operator's compartment 12 which may be vertically adjusted by means of four supporting posts 15. The operator's compartment 12 includes a floor 19 and a rear side wall portion 13. A steering wheel 16 and suitable foot controls 17 are also provided within operator's compartment 12, as is seat 20. Seat 20 includes a seat portion 22, lower back portion 24 and upper back portion 26. A mounting bracket 28 is provided on a back side of the lower back portion 24. Seat 20 is suspended from the side wall 13 of compartment 12 by the seat suspension 30 of the present invention.

Referring to FIGS. 3 through 8, the structure and operation of the seat suspension 30 will be described. In its simplest form, the seat suspension 30 of the present invention includes fixed bracket means 40, sliding bracket means 60 and vertical suspension means 80 operably connected between the fixed bracket means and sliding bracket means for supporting seat 20 and for reducing and dampening vibration and shock transmitted from the mining machine to the seat. As shown, the seat suspension which includes fixed bracket means 40, sliding bracket means 60 and seat suspension means 80 is compactly positioned entirely behind seat 20.

Fixed bracket means 40 is generally rectangular in shape and includes a vertically positioned plate member 44 into which a large central window or opening 45 is provided. A pair of spaced apart upper horizontal aperatured flange segments 41 are provided on an upper end of plate 44 and a pair of spaced apart lower horizontal aperatured flange segments 42 are provided on a lower end of plate 44. Additionally, a pair of spaced apart intermediate horizontal aperatured flange segments 43 are provided on plate 44 intermediate the upper and lower ends thereof. Fixed bracket means 40 includes a pair of spaced apart, vertically aligned, parallel aperatured flange segments 49 extending upwardly from a lower cross member of fixed bracket means 40. (FIG. 5) Fixed bracket means 40 also includes a pair of opposite side edges 46. A pair of vertically spaced apart pins 48 extend outwardly from each of the two opposite side edges 46.

Finally, fixed bracket means 40 also includes vertical guide means 50 which consists of two parallel vertical rod members 51 each having upper threaded ends 52 and lower threaded ends 53 which extend through and are secured to the fixed bracket means 40 by the upper and lower flange segments 41 and 42 described above and by nuts 55 as is best shown in FIG. 7.

Sliding bracket means 60 includes a generally rectangular vertical plate member 61 into which a window or opening 65 is provided. A pair of spaced apart horizontally extending aperatured flange segments 62 are provided on an upper end of plate 61 and a pair of spaced apart lower horizontally extending aperatured flange segments 64 are provided on a lower portion of plate 61. Suitable bushings 63 are preferably provided in the openings of aperatured flange segments 62 and 64. Sliding bracket means 60 also includes a pair of spaced apart, vertically aligned, parallel aperatured flange segments 66 which extend upwardly from an upper end of bracket means 60. Sliding bracket means 60 is securely bolted or otherwise secured to mounting bracket 28 provided on the lower back portion 24 of seat 20.

Flange members 62 and 64 of sliding bracket means 60 are adapted to be received by and to travel on the rod members 51 of the fixed bracket means 40.

The vertical suspension means 80 of the present invention preferably consists of a pair of spaced apart compression springs 81 and a single vertical hydraulic cylinder 84. An upper end of the cylinder 84 is bolted between the flange segments 66 of sliding bracket means 60. Suitable spacers 67 are provided to maintain end 85 of the cylinder in a proper position. (FIG. 5) Lower end 86 of cylinder 84 is bolted between the flange segments 49 of the fixed bracket means 40. Windows 45 and 65 provided respectively in fixed bracket means 40 and sliding bracket means 60 insure sufficient clearance for a smooth operation of cylinder 84 while aiding in keeping the seat suspension as compact as possible.

Figure 7:
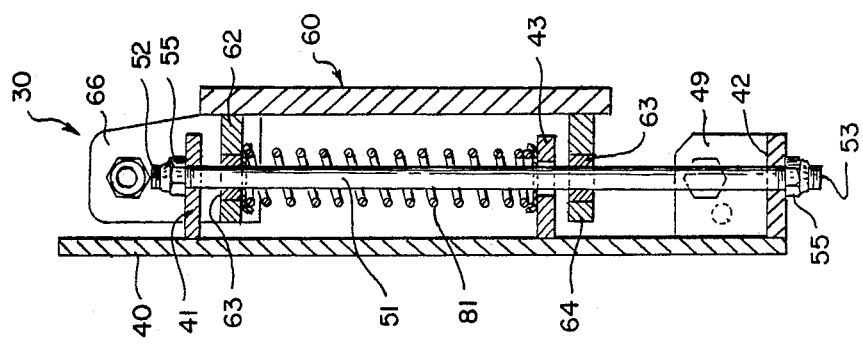
FIG. 7 is a cross sectional view taken on the line VII—VII of FIG. 6.
Figure 4:
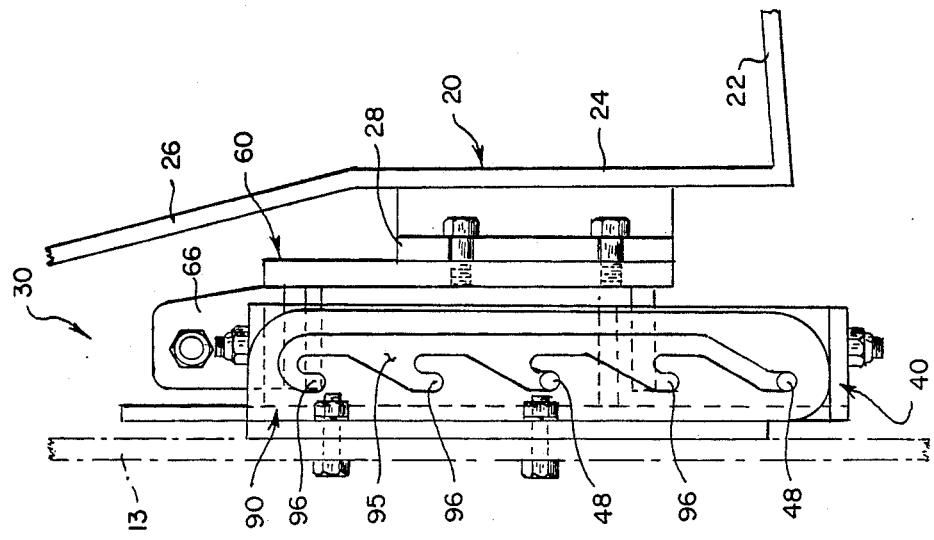
FIG. 4 is a side elevational view of the seat suspension of the present invention in assembled form.
Figure 6:
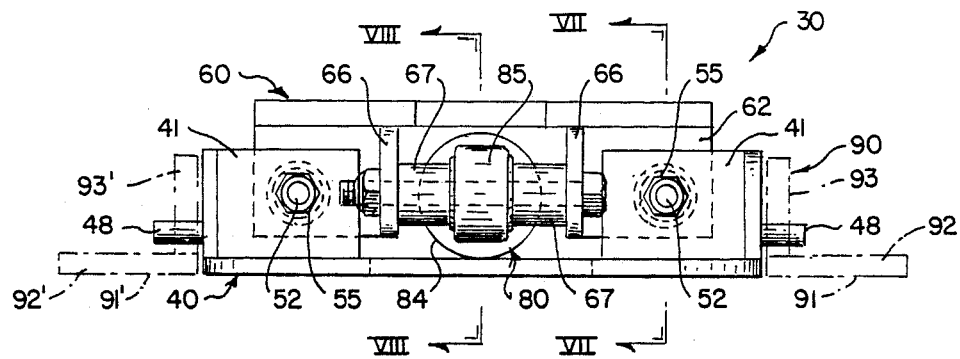
FIG. 6 is a top view of the seat suspension of FIGS. 4 and 5.
Figure 5:
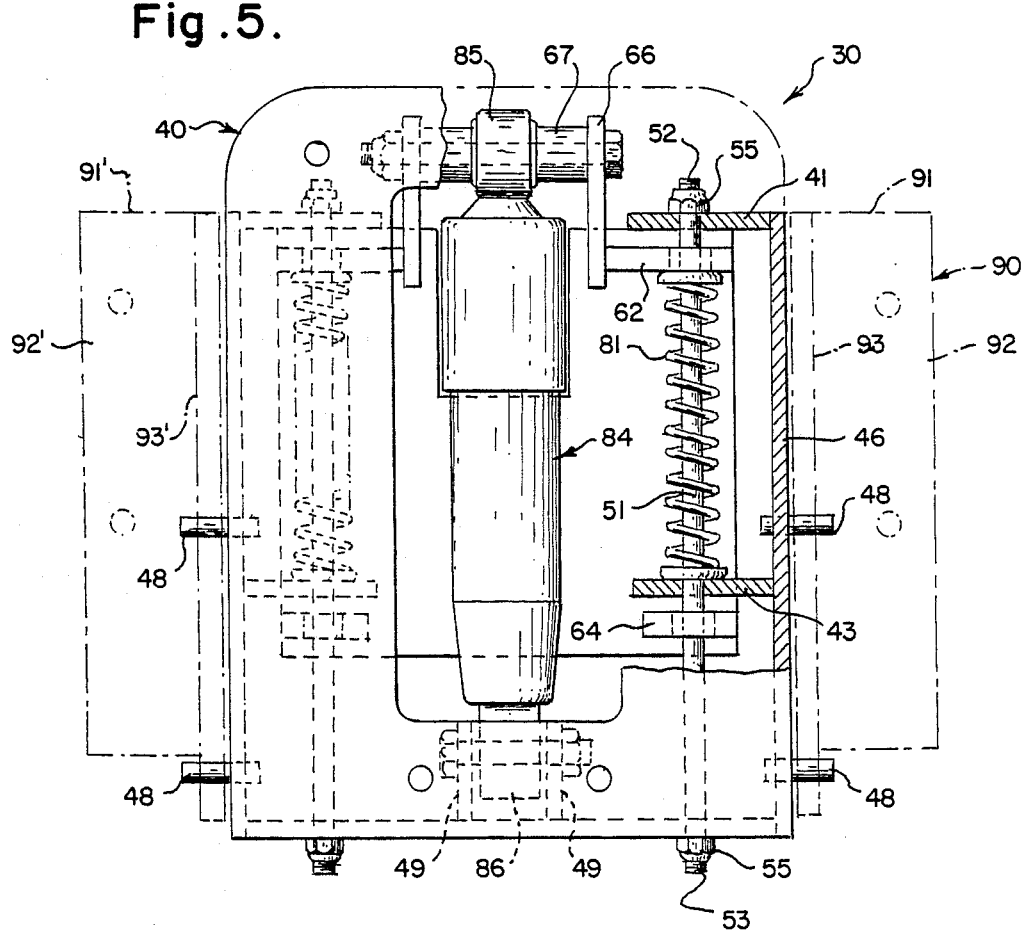
FIG. 5 is a rear elevational view partially broken away and in section of the seat suspension of FIG. 4.

Each compression spring 81 is positioned on one of the rod members 51 and is retained between the upper flange segments 62 of the sliding bracket means 60 and an intermediate horizontal flange segment 43 of the fixed bracket means 40. (FIG. 7)

Fixed bracket means 40 may be attached directly to a side wall 13 of operator compartment 12 of a mining vehicle 10. It is preferred, however, that the fixed bracket means 40 be adjustably attached to side wall 13 by the provision of hanger means 90 which allows the fixed bracket means 40 to be selectively positioned at any one of a plurality of spaced apart vertical locations. This feature of the present invention makes the seat suspension useful for a variety of individuals of greatly varying weights. Hanger means 90 includes a pair of vertically extending spaced apart hanger members 91, 91' which are adapted to be securely attached to side wall 13 and further adapted to receive and retain pins 48 at a desired vertical height. For this reason, pins 48 are considered to be a part of the hanger means of the present invention. Hanger members 91 and 91' are mirror images of one another and each has a generally L-shaped cross sectional configuration with one wall portion 92, 92' adapted to be bolted directly to wall 13 and a remaining wall portion 93, 93' adapted to receive pins 48. An elongated recess 95, 95' is provided in each of the hanger members which extends substantially the entire length of the member. The recess 95, 95' includes a plurality of notches 96, 96' along one side of the recess which are sized and configured to receive and retain pins 48 at a desired vertical height.

In practice, hanger members 91, 91' are placed on pins 48 of the fixed bracket means 40 and then the hanger members 91 are securely bolted to side wall 13. In this way, the pins are at all times captured within the recesses 95, 95'. As shown in the figures, seat 20 is provided in a lower of three possible vertical positions. To provide a different vertical adjustment, the entire seat may be lifted upwardly and pins 48 may be guided into the notches 96 which provide a desired height adjustment.

It will be appreciated by those skilled in the art that the present invention will provide increased comfort for operators of mining equipment which was heretofore deemed to have insufficient space for a seat suspension. Because of the compact nature of the seat suspension of the present invention and because it is positioned entirely behind the seat, the suspension may be utilized in a variety of low height environments. As is apparent from the figures, the present invention allows for only a very limited vertical travel of the sliding bracket means relative to the fixed bracket means. Accordingly, relatively heavy coil springs are preferred to reduce the frequency of contact between the horizontal flange segments of the sliding and fixed bracket means. The coil springs are utilized to isolate the seat and its passenger from vibration and shock transmitted from or through the mining machine to the seat. Additionally, a hydraulic cylinder is utilized primarily to dampen oscillation of the seat on the springs. It is contemplated that various other combinations of springs and/or hydraulic cylinders could be utilized to provide a satisfactory seat suspension according to the present invention. However, the provision to two spaced apart coil springs on opposite sides of a single hydraulic cylinder is presently believed to provide the greatest comfort for the operator in the most compact configuration.

Whereas particular embodiments of the present invention have been described above for the purposes of illustration, it will be appreciated by those skilled in the art that numerous variations of the details may be made without departing from the invention described in the appended claims.

We claim:

1. A seat suspension for an underground mining machine comprising:
   (a) fixed bracket means adapted to be attached to a side wall of an operator compartment of an underground mining machine, said fixed bracket means including plural rod members each having upper and lower ends attached respectively to upper and lower portions of said fixed bracket means;
   (b) sliding bracket means including plural upper horizontal apertured flange segments and plural lower horizontal apertured flange segments, said flange segments sized and positioned to receive and slide on said plural rod members to provide relative vertical movement with respect to said fixed bracket means, said sliding bracket means attached to a back portion of a seat provided within the operator compartment; and
   (c) vertical suspension means operably connected between said fixed bracket means and said sliding bracket means for supporting the seat and for reducing and dampening vibration and shock transmitted from the mining machine to the seat, said fixed bracket means, said sliding bracket means and said suspension means each positioned entirely behind said seat.

2. A seat suspension according to claim 1 wherein said vertical suspension means includes compression spring means carried on said plural rod members and dampening means.

3. A seat suspension according to claim 2 wherein said compression spring means consists of a pair of spaced apart vertically aligned compression springs.

4. A seat suspension according to claim 2 wherein the dampening means is a single vertical hydraulic cylinder provided centrally between said sliding bracket means and said fixed bracket means with an upper end of the cylinder attached to an upper end of the sliding bracket means and a lower end of the cylinder attached to a lower end of the fixed bracket means.

5. A seat suspension according to claim 4 wherein said plural rod members include two parallel vertical rod members positioned on opposite sides of the cylinder.

6. A seat suspension according to claim 1 additionally comprising two pairs of vertically spaced apart pins, one pair extending outwardly from each of two opposite side edges of said fixed bracket means and a pair of vertically extending spaced apart hanger members, said hanger members adapted to be securely attached to the side wall and to receive and retain said pins at a desired vertical height.

7. A seat suspension according to claim 6 wherein each of said hanger members has a generally L-shaped cross sectional configuration with one wall portion adapted to be affixed to said side wall and a remaining wall portion adapted to receive said pins, said remaining wall portion including an elongate recess extending substantially the entire length of the member and said recess including a plurality of notches along one side thereof sized and configured to receive and retain said pins at a desired vertical height.

8. A seat suspension for an underground mining machine comprising:
   (a) fixed bracket means adapted to be attached to a side wall of an operator compartment of an underground mining machine, said fixed bracket means including two parallel vertical rod members each having upper and lower ends attached respectively to upper and lower ends of the fixed bracket means;
   (b) sliding bracket means including a pair of upper spaced part horizontal apertured flange segments on an upper end thereof and a pair of lower spaced apart horizontal apertured flange segments on a lower end thereof, said flange segments sized and positioned to receive and travel on said rod members for relative vertical movement with respect to said fixed bracket means, said sliding bracket means attached to a back portion of a seat provided within the operator compartment; and
   (c) vertical suspension means operably connected between said fixed bracket means and said sliding bracket means for supporting the seat and for reducing and dampening vibration and shock transmitted from the mining machine to the seat, said suspension means including a pair of compression springs carried by said rod members and a vertical hydraulic cylinder provided between said rod members and between said sliding bracket means and said fixed bracket means with an upper end of said cylinder attached to an upper end of said sliding bracket means and a lower end of said cylinder attached to a lower end of said fixed bracket means, said sliding bracket means and said suspension means each positioned entirely behind said seat.

9. A seat suspension according to claim 8 wherein the upper and lower ends of the rod members are threaded and extend through and are attached to the fixed bracket means by a spaced apart upper pair and a spaced apart lower pair of horizontal apertured flange segments provided on said fixed bracket means and by nuts.

10. A seat suspension according to claim 9 wherein said compression springs are retained between the upper flange segments of the sliding bracket means and a pair of spaced apart intermediate horizontal apertured flange segments provided on the fixed bracket means intermediate the upper and lower horizontal apertured flange segments.

* * * * *

UNITED STATES PATENT AND TRADEMARK OFFICE
CERTIFICATE OF CORRECTION

PATENT NO. : 4,817,908
DATED : April 4, 1989
INVENTOR(S) : Ronald D. Hanlon & Ronald K. Dickey It is certified that error appears in the above-identified patent and that said Letters Patent is hereby corrected as shown below:

Col. 3, line 29, delete "IG." and substitute --FIG.-- therefor.

Col. 8, line 8, insert --said fixed bracket means,-- before "said," (first occurrence).

Signed and Sealed this

Twenty-second Day of June, 1993

Attest:

MICHAEL K. KIRK

*Attesting Officer*    Acting Commissioner of Patents and Trademarks